Patented Apr. 7, 1936

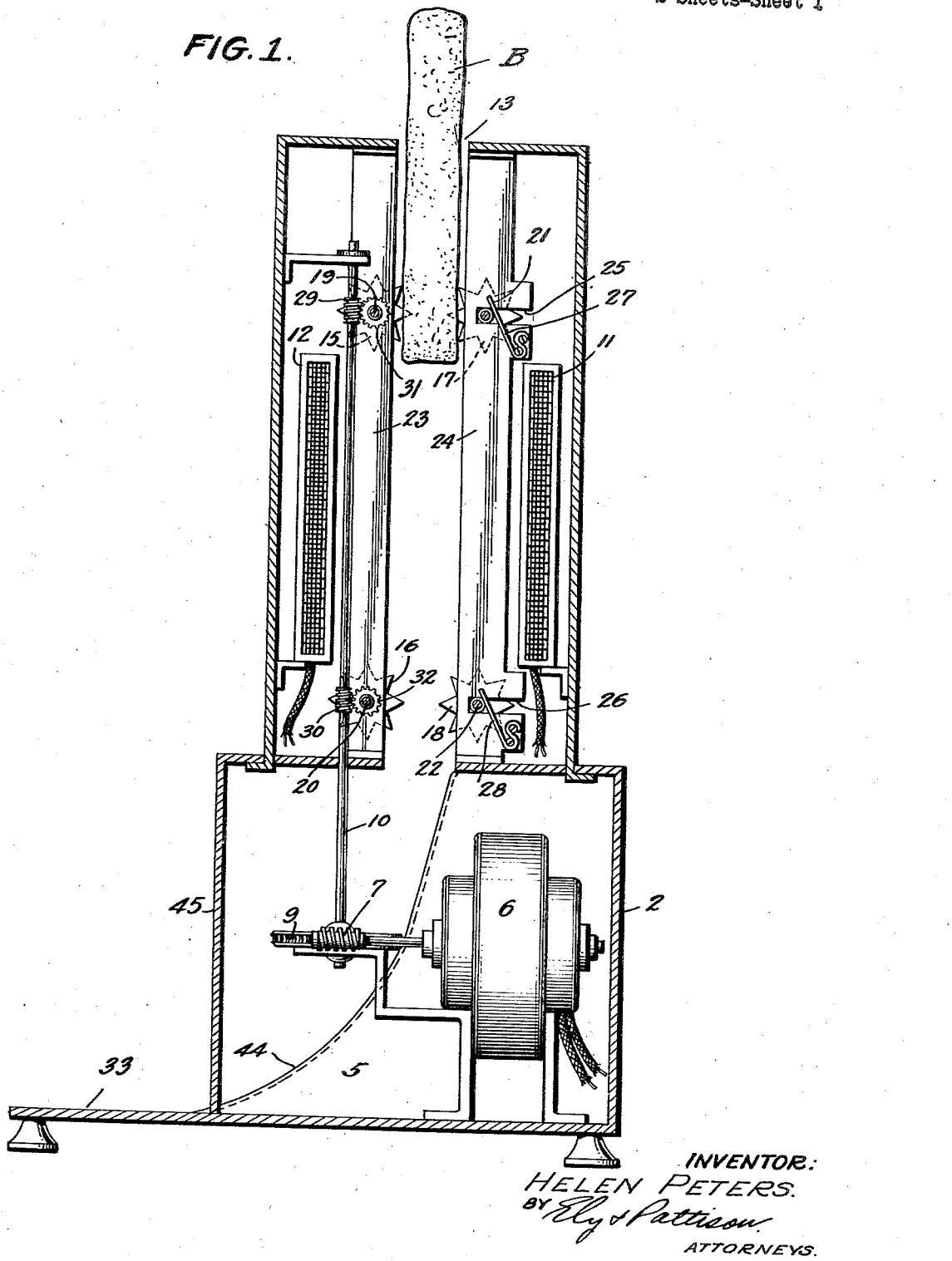

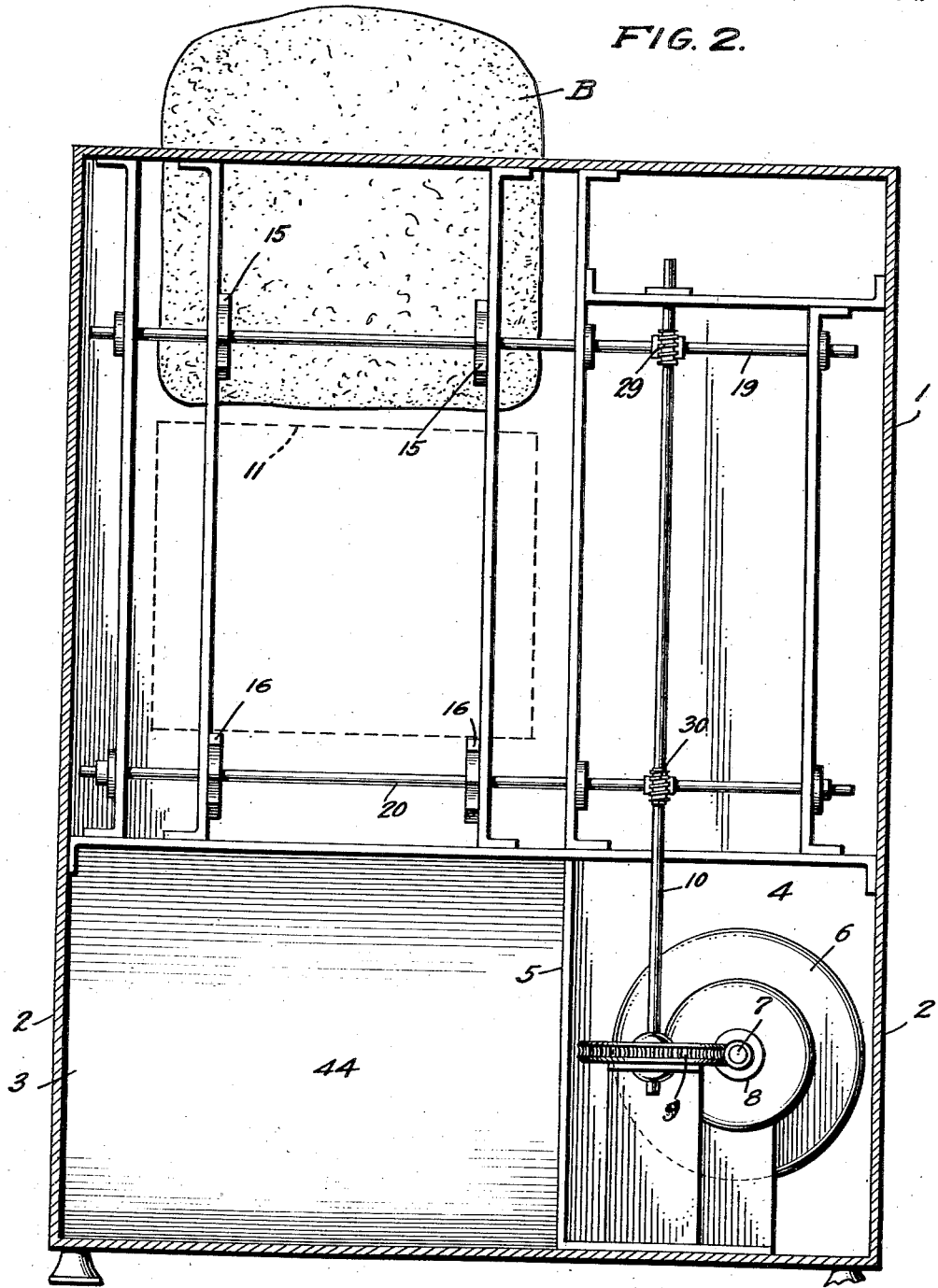

2,036,826

UNITED STATES PATENT OFFICE 2,036,826

AUTOMATIC TOASTER

Helen Peters, Valley Stream, N. Y.

Application October 11, 1934, Serial No. 747,838

7 Claims. (Cl. 53—5)

This invention relates to kitchen appliances and more specifically to an improved appliance for better toasting slices of bread automatically on both sides at the same time.

My improved automatic toaster consists of a heating cabinet including means for propelling and keeping in suspension in upright position the slices of bread to be toasted therethrough.

These improved means for propelling and keeping uprightly the slices of bread to be toasted on both sides at the same time form one of the outstanding features of my invention.

When slices of bread rest vertically on stationary or moving means between two vertical heating units, the lower edge sides of the slices resting on these means are not properly toasted or are not toasted at all, because of the shielding by the supporting means on which the lower edge sides of the slices rest. To keep the slices of bread in vertical position between two vertical heating units, guard wires are generally used and set so far apart that the slices inevitably lean toward either heating unit, with no toasting uniformity as result.

Now, with my newly invented useful improvements the use of a stationary and moving means between the lower edge sides of the slices and the heating units is eliminated entirely, because the slices are propelled by opposed sets of turning star like sprockets without resting on any stationary or carrying means. With this improved arrangement the slices of bread actually move in suspension and are not standing still on the carrier even if the carrier is in motion.

By the same improvements furthermore the slices of bread are propelled throughout the heating cabinet in upright position without assistance of guard wires, and are automatically kept at equal distance from the heating units, without a chance of leaning toward either one, regardless of the slices' thickness.

With these new and useful improvements, the slices of bread are uniformly toasted; the individual flavor of each bread ingredient is developed and brought out and sealed in; the sugar in the outside layers of the honeycombed crumb is properly caramelized and perfectly changed into golden goodness; the tiny shreds of gluten are parched and roasted into crispness to the highest degree.

I attain these objects by the mechanism illustratd in the accompanying drawings, in which—

Figure 1 is a vertical section of a preferred form of the appliance.

Figure 2 is a longitudinal section of a preferred form of the appliance, heating units being omitted.

Referring to the accompanying drawings wherein like reference characters refer to similar parts throughout the several views, the numeral 1 designates an elevated heating chamber mounted upon a casing or hollow base 2 which is divided into separate compartments 3 and 4 by a transverse partition 5. An electric motor 6 is mounted within the compartment 4 and the armature shaft 7 thereof extends forwardly and carries a worm gear 8 which is in constant mesh with a drive gear 9 fixed to the lower end of a vertical shaft 10 which rises into the heating cabinet 1 and which shaft is mounted in suitable bearings adjacent its opposite ends. The worm gear 8 and drive gear 9 form a speed reduction between the motor driven shaft 7 and the driving shaft 10 for a purpose to be presently explained.

Fixedly supported within the heating cabinet 1 are two horizontally opposed spaced electric heating elements 11 and 12 which radiate heat inwardly toward each other and are substantially flat and rectangular in configuration to provide ample heating surface for the area of a slice of bread to be toasted during its passage downward therebetween.

The top of the heating cabinet 11 is provided with an elongated entrance opening 13 disposed in a plane intermediate the heating elements 11 and 12 and of a width and length to freely receive an ordinary size slice of bread B for toasting purposes. Directly below the opening 13 is a similar opening 14 establishing communication between the heating cabinet 1 and the compartment 3 through which the toast passes for discharge down a chute 44 arranged in the compartment 3 and out through an exit opening 45 in the front thereof. The length of time required for the passage of a slice of bread past the heating elements is predetermined and controlled by the speed of feeding mechanism now to be described.

The slices of bread are fed downward through the heating cabinet 1 by sets of upper and lower star wheels or other like toothed wheels, the upper set being numbered 15 and 17 and the lower set 16 and 18, respectively. The star wheels 15, 16, 17, and 18 are respectively fixed to horizontally disposed shafts 19, 20, 21, and 22. The shafts 19 and 20 are vertically alined and journaled in bearing brackets 23 extending the height of the heating cabinet 1 while the vertically alined shafts 21 and 22 are yieldably journaled in upstanding brackets 24. The brackets 23 and 24 are so spaced that the teeth of the star wheels extend into the path of a slice of bread dropped through the opening 13, and the upper and lower sets are so spaced that when a slice of bread is released from the upper set of star wheels, the same will immediately be fed in a continuous movement by the lower set of star wheels in a direction toward the exit opening 14.

The shafts 21 and 22 mounted in the bracket 24 are seated in horizontal slots 25 and 26 respectively, and are urged inwardly by springs 27 and 28 respectively. By yieldably mounting the shafts 21 and 22, the upper and lower sets of feed wheels may facilitate the feeding of different thicknesses of sliced bread in the presence of the heat from the heating elements 11 and 12.

The fixedly journaled shafts 19 and 20 are driven from the vertical shaft 10 by means of worms 29 and 30 meshing with gears 31 and 32 respectively, the latter gears being fixed to the shafts 19 and 20 respectively. The star wheels 17 and 18 may be termed idlers, but coact with the opposed driven star wheels 15 and 16 and turn therewith during the passage of a piece of bread through the device during a toasting operation.

In practice, assume that a slice of bread B is dropped into the top entrance opening 13, the lower end of the slice will drop upon the top set of feed wheels 15 and 17. Upon turning on of the motor 5, the driving shaft 10 will impart a slow turning movement to the feed wheel shafts 19 and 20 due to the reduction gearing between the motor shaft 7 and the driving shaft 10. Thus it will be seen that the driving wheels 15 and 16 will turn in a feeding direction at a predetermined rate of speed. It is of course assumed that prior to the insertion of a piece of bread to be toasted, that the current to the heating elements 11 and 12 has been turned on which sets up a heating field through which the slice of bread must pass in its downward movement to the exit opening 14 and thence through the chute 44. During the passage of the slice of bread downward, it will be understood that the same is successively engaged by the teeth of the upper and lower sets of star wheels, and which teeth bite or embed themselves in opposite sides of the bread to positively feed the same in a downward direction. By reason of the teeth of the star wheels engaging opposite sides of the bread the edges of the bread are exposed to the heat and will become toasted the same as the opposite sides of the slice. The speed of the feeding means is so timed with respect to the heat that the interval of time which elapses between the placing of a slice of bread into the toaster and its exit therefrom is sufficient to properly toast the slice evenly. Tests have proven that a period of between 45 seconds and 1½ minutes should elapse during the feeding of a slice of bread in the presence of the heat from the heating elements 11 and 12. Such interval of time is necessary to produce proper toast for if the intensity of the heat is increased proportionately to an increased speed of the feeding means perfect toast will not result, as the outer surface of the bread would have a tendency to burn without properly caramelizing the crumb which is the desirable feature of properly toasted bread.

After passing through the passage between the heating elements 11 and 12, the toasted slice of bread will pass through the opening 14 down the chute 44 and out through the exit opening in the front of the casing 2 and onto a platform 33 extending forwardly from the front thereof.

While I have shown and described what I consider to be the preferred embodiment of my invention, I wish it to be understood that such changes and alterations as come within the scope of the appended claims may be resorted to if desired.

I claim:

1. In a bread toaster having heating units facing each other, sets of rotating star like wheels for holding in suspension slices of bread to be toasted and for propelling said slices in vertical position between said heating units.

2. A bread toaster comprising a cabinet having heating units facing each other, means for propelling slices of bread to be toasted between said heating units including opposed sets of star like wheels for supporting and directing the slices of bread to be toasted in the center of the cabinet, in vertical position as they actually move from the entrance towards the exit of the toaster.

3. A bread toaster comprising in combination, of a heating cabinet having heating units facing each other, a feed opening, a discharge opening, opposite upper and lower sets of rotating star like wheels for supporting and propelling slices of bread to be toasted through the heating cabinet, and spring means for moving backward and forward the star like wheels of all the sets of one side, in order to catch, propel and direct slices of bread of any thickness suitable for toast.

4. A bread toaster comprising a casing having a passage therein for the passage of a slice of bread to be toasted, a pair of opposed heating units respectively disposed on opposite sides of said passage, sets of upper and lower feed wheels disposed in the path of a slice of bread in its movement through said passage, each set of feed wheels including opposed wheels respectively disposed on opposite sides of said passage, and driving means for imparting turning movement to those wheels of the upper and lower sets disposed on one side of said passage.

5. A bread toaster comprising a casing having a passage therein for the passage of a slice of break to be toasted, a pair of opposed heating units respectively disposed on opposite sides of said passage, sets of upper and lower feed wheels disposed in the path of a slice of bread in its movement through said passage, each set of feed wheels including opposed wheels respectively disposed on opposite sides of said passage, and driving means for imparting turning movement to those wheels of the upper and lower sets disposed on one side of said passage, the feed wheels disposed at the other side of said passage being idler feed wheels, and yieldable bearings for the idler feed wheels to facilitate movement of the same toward and away from the opposed driven feed wheels to compensate for the passage of bread of various thicknesses through said passage.

6. A bread toaster comprising a casing having an entrance opening in the top and an exit opening at the bottom thereof, a pair of fixed spaced heating elements within said casing between which a slice of bread to be toasted is adapted to pass in its movement from said entrance to said exit, sets of spaced opposed upper and lower tooth feed wheels mounted on a plane intermediate said heating elements, in the path of a slice of bread inserted in said entrance opening, means for imparting driving rotation to certain of said upper and lower sets of tooth wheels to cause the teeth of said tooth wheels to embed themselves in opposed sides of a slice of bread to support the slice of bread in vertical suspension and feed the same downwardly toward said exit opening.

7. A bread toaster comprising a casing having an entrance opening in the top and an exit opening at the bottom thereof, a pair of fixed spaced heating elements within said casing between which a slice of bread to be toasted is adapted to pass in its movement from said entrance to said exit, vertically alined driving tooth wheels, vertically alined idler tooth wheels horizontally alined with said driven tooth wheels and spaced therefrom, the teeth of the opposed wheels being in the path of movement of a slice of bread dropped into said entrance opening, and motor driven means enclosed within said casing for imparting driving movement to said driving tooth wheels.

HELEN PETERS.